United States Patent [19]

Buter et al.

[11] Patent Number: 5,730,581
[45] Date of Patent: Mar. 24, 1998

[54] ROTOR BLADE

[75] Inventors: Andreas Buter; Matthias Piening, both of Braunschweig, Germany

[73] Assignee: Deutsche Forschungsanstalt fur Luft-und Raumfahrt e.V., Braunschweig, Germany

[21] Appl. No.: 691,459

[22] Filed: Aug. 2, 1996

[30] Foreign Application Priority Data

Aug. 2, 1995 [DE] Germany ............ 195 28 155.1

[51] Int. Cl.⁶ ............................................. F04D 29/18
[52] U.S. Cl. ............................................. 416/23; 416/24
[58] Field of Search .......................... 416/23, 24, 223 R

[56] References Cited

U.S. PATENT DOCUMENTS

| | | | |
|---|---|---|---|
| 2,405,208 | 8/1946 | Harris | 416/23 |
| 2,625,997 | 1/1953 | Doak | 416/24 |
| 2,716,460 | 8/1955 | Young | 416/24 |
| 3,042,371 | 7/1962 | Fanti | 416/229 A |
| 3,547,377 | 12/1970 | Frey | 418/24 |
| 3,822,105 | 7/1974 | Jepson . | |
| 5,314,308 | 5/1994 | Reed, III | 416/23 |
| 5,409,183 | 4/1995 | Gunsallus | 416/24 |

FOREIGN PATENT DOCUMENTS

| | | |
|---|---|---|
| 2 238 250 | 3/1973 | Germany . |
| 28 56 400 A1 | 7/1979 | Germany . |
| 2 012 698 | 8/1979 | United Kingdom . |

OTHER PUBLICATIONS

Amerigo, Marc P. and Baeder, James D, "Feasibility of Arbitrary Pitching Motion Controlled by Piezoceramic Actuators to Reduce Blade–Vortex Interaction Noise." Presented to the American Helicopter Society 51st Annular Forum, Fort Worth, Texas on May 11, 1995.

Japanese Abstract M–1274, *Patent Abstracts of Japan*, vol. 16/No.299, Jul. 2, 1992.

*Aviation Week & Space Technology*, Apr. 20, 1987, pp.50–56.

*Primary Examiner*—John T. Kwon
*Attorney, Agent, or Firm*—Salter & Michaelson

[57] ABSTRACT

A rotor blade made of fiber-reinforced synthetic resin has a profile which, at least in the region of the blade tip is designed so as to be twistable by actuators about the rotor blade longitudinal axis. The torsion skin of the rotor blade in the region of the blade tip is designed anisotropically in the sense of a tension/torsion coupling and a controllable actuator, which acts in a longitudinal direction of the rotor blade upon the rotor blade tip, is disposed in the rotor blade spar. To achieve anisotropy, the torsion skin is a uni-directional winding having a winding angle of less than 45° relative to the rotor blade longitudinal axis. The winding angle is dependent upon the force-to-displacement ratio of the actuator and may lie between 18° and 40°. In the region of the blade tip, the anisotropic torsion skin is disposed resting loosely on the rotor blade spar.

16 Claims, 1 Drawing Sheet

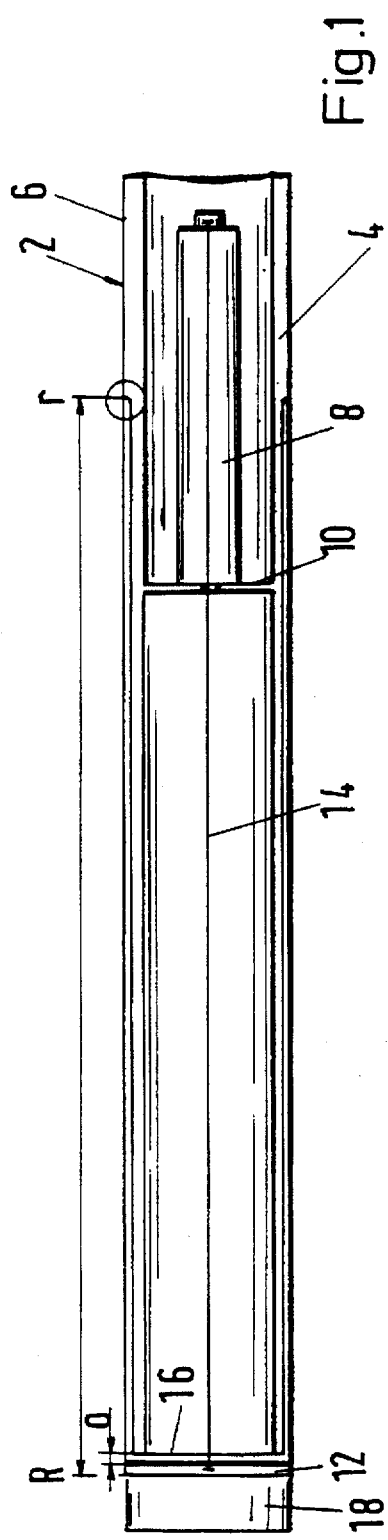
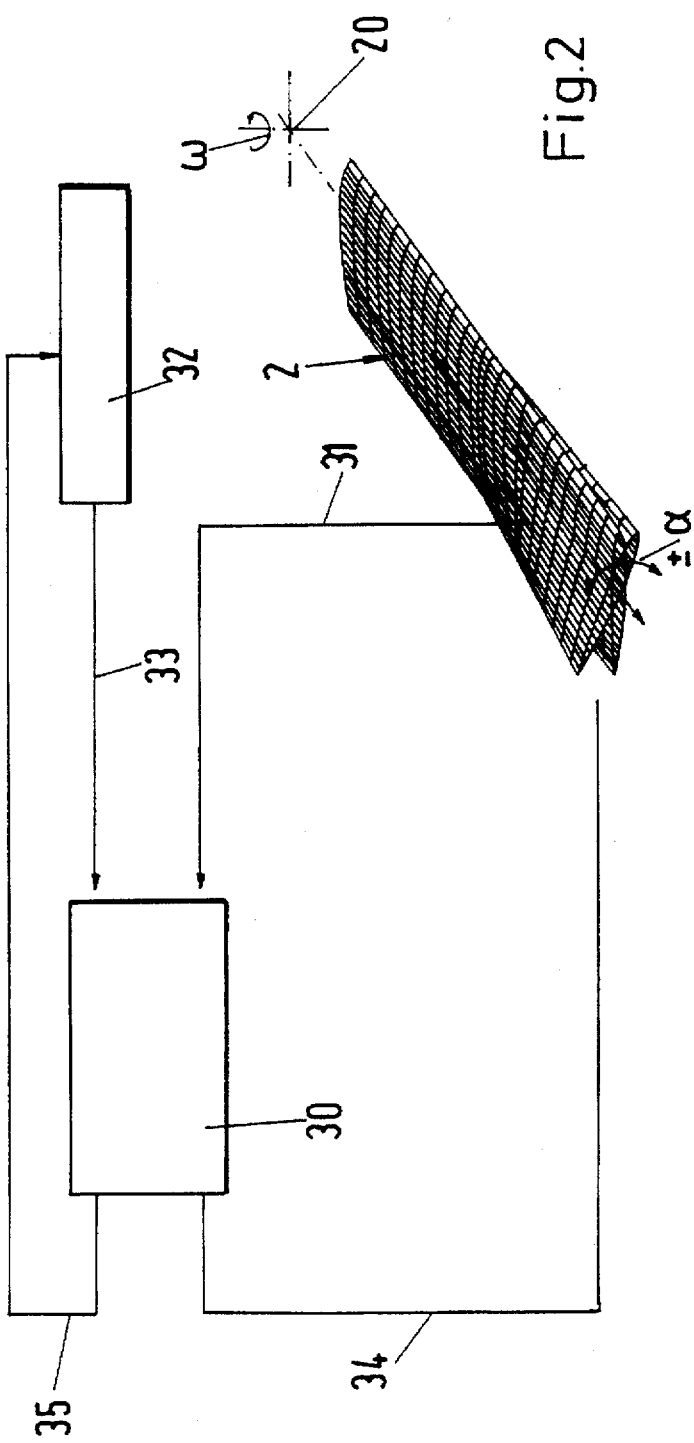

ROTOR BLADE

BACKGROUND OF THE INVENTION

The invention relates to a rotor-blade and more particularly to a twistable rotor blade made of fibre-reinforced synthetic resin, the profile of which at least in the region of the blade tip is designed so as to be twistable by actuators about the rotor blade longitudinal axis.

In rotor blades of large longitudinal extension and low profile depth, such as are used in particular in the rotating wing unit of rotary wing devices, especially helicopters, aerodynamic forces cause rotor blade oscillations and vibrations which lead substantially to noise emission and vibrations of the fuselage. In a rotary wing aircraft, especially a helicopter, there are moreover further effects caused by the various forces which act in different ways depending on the angular position of the respective rotor blade relative to the longitudinal axis of the fuselage. Quantities or variables which determine the dynamic system of the rotor are the dynamic properties of the rotor blades, their mass, damping and stiffness ratios as well as the blade boundary conditions.

The above basically also applies to other rotors having rotor blades of large longitudinal extension and low profile depth, such as are used in windmills, for example.

From a paper entitled "Feasibility of Arbitrary Pitching Motion Controlled by Piezoceramic Actuators to Reduce Blade-Vortex Interaction Noise" presented by Marc P. Amerigo and James D. Baeder to the American Helicopter Society 51st Annular Forum, Fort Worth, Tex., on May 9–11, 1995, it is known to effect a twisting of an orthotropically wound rotor blade by means of strip-like two-dimensional piezoelements integrated into the torsion skin of the rotor blade, at the two top sides of the profile, each in an opposite angular direction. Piezoelements of said type are limited in terms of the forces which have to be applied for twisting.

SUMMARY OF THE INVENTION

The present invention seeks to provide a rotor blade of the type described in such a way that the twisting of the rotor blade for varying the aeroelastic equations of motion of the rotor and the system driven by the rotor is possible in a simpler and more effective manner.

Accordingly, the invention provides a rotor blade made of fibre-reinforced synthetic resin and having a longitudinal axis and comprising a rib position and a tip position, wherein said blade has a torsion skin, said torsion skin in the region of said tip, being arranged anisotropically in the sense of a tension/torsion coupling, and wherein a controllable actuator is disposed in said spar, the profile of said blade, at least in the region of said tip, being twistable by said actuator, and said actuator acting upon said tip in the direction of said longitudinal axis.

BRIEF DESCRIPTION OF THE DRAWING(S)

A preferred embodiment of the present invention will now be described by way of example only, with reference to the accompanying drawings, of which:

FIG. 1 shows in longitudinal section the tip of a rotor blade constructed according to the invention; and FIG. 2 diagrammatically illustrates the blade twist at the tip of a rotor blade constructed according to the invention and also the basic configuration of a possible closed-loop control concept.

DESCRIPTION OF THE PREFERRED EMBODIMENT

The rotor blade 2, of which the blade tip region is shown in FIG. 1, is of a conventional construction in the region shown to the right of the radius $r_1$, comprising a spar 4 reinforced in a flexurally and longitudinally stiff manner by unidirectional fibres and a torsionally stiff skin 6 disposed on the spar and firmly connected to the spar. In the region of the blade tip between the radii r and R, the torsion skin 6 is uncoupled from the spar carrier. To said end, the torsion skin may be designed so as to rest loosely on the spar carrier. It is however also possible to dispose in said region, between the torsion skin and the spar carrier, a transversely non-rigid intermediate layer, by means of which the torsion skin is held in position on the rotor blade spar and which may simultaneously serve as a winding carrier upon winding of the torsion skin.

In the region r-R, the torsion skin 6 is designed with a winding direction anisotropically in order to achieve a tension/torsion coupling by means of an additional winding. Thus, a normal force acting in a longitudinal direction of the rotor blade upon the rotor blade tip towards the blade root leads, in said region, to a twisting of the torsion skin on the rotor blade spar. As a result of said twisting, the aerodynamic flow conditions are varied and said variation may be used to control or influence disturbances such as result, for example, from fluctuations in aerodynamic forces, blades motions, vortices and the like.

To avoid sudden changes in rigidity, it is necessary in the region of the transition from the torsion skin fastened on the spar to the rotatable region of the torsion skin to provide a continuous transition or smooth merging of the anisotropic winding of the torsion skin in the region of the blade tip into the winding of the torsion skin in the region of the rotor blade lying radially inwards thereof by gradually adapting the winding angle of the additional winding.

The winding angle of the anisotropic additional winding is dependent upon the force to be applied by the selected actuator and upon the displacement to be effected by the actuator. The lower the ratio of displacement/force is so the winding angle is to be made smaller. Thus, for example, said angle may be in the order of magnitude of 18° relative to the rotor blade longitudinal axis when using a piezoactuator which, given small variations in length, is capable of applying high forces. In the case of an actuator with low forces but large variations in length, the anisotropic additional winding may lie, for example, at an angle in the order of magnitude of 40° relative to the rotor blade axis. The additional winding may be disposed below, but also above, the ±45° winding of the torsion skin.

A twisting of the torsion skin 6 in the region of the blade tip, and hence a variation of the angle of attack, is effected in the embodiment according to FIG. 1 by means of an actuator 8 which generates pressure forces in a longitudinal direction of the rotor blade. Said actuator may be, for example, a piezoactuator, a magnetostrictive actuator or a hybrid actuator combining various forms of actuators. The actuator is fastened and axially fixed to the side, remote from the blade tip, of a supporting wall 10 disposed in the spar.

Disposed at the tip of the rotor blade is a retaining plate 12, which rests frontally on the end of the anisotropic torsion skin and is moreover firmly connected to the end of the anisotropically wound torsion skin. Disposed between the actuator 8 and the plate 12 is a tension element 14, which is fastened by one end to the end of the actuator 8 remote from the blade tip and is firmly connected by its other end to the retaining plate 12. As a means of transmitting tensile force, a rope of high-strength fibres of low longitudinal strains may be provided.

By virtue of a variation in length of the actuator 8, a pressure force is transmitted via the tension element 14 and the retaining plate 12 to the end face of the torsion skin and brings about a twisting of the rotor blade profile—angle α—in dependence upon the anisotropy of the torsion winding, in the manner diagrammatically illustrated in FIG. 2. To enable the motion effecting the torsion to be carried out, a spacing a is to be provided between the retaining plate 12 and the end face 16 of the spar.

By virtue of a shortening of the actuator, the centrifugal forces acting upon the blade tip may produce an effect in the sense of a twisting with an opposite angle of twist.

The anisotropically wound portion of the torsion skin is elastically deformed by the applied pressure force. The forces thereby induced in the torsion skin may be utilized as restoring forces. In addition, centrifugal forces may also be used for the reverse rotation of the torsion skin. Thus, it is possible to fasten on the retaining plate 12 a weight 18, which acts upon the anisotropic torsion skin via the retaining plate which, in this case, is connected in a transversely fixed manner to the end of the anisotropic torsion skin. For said purpose, it is possible to use the weight, e.g. of built-on parts which are in many cases anyway provided on the end of rotor blades.

By virtue of a shortening of the actuator 8, it is possible by means of the weight 18 for the portion of the anisotropically wound torsion skin to be subjected to tensile stress by the centrifugal force, which leads to an oppositely directed twisting of the rotor blade profile—angle α—in dependence upon the anisotropy of the torsion winding.

Preferably the actuators are electrically controllable. All what is necessary is to lay electric conductors over the length of the rotor blade from the rotor blade root to the actuator.

When using electrically operated actuators, the change in the angle of incidence of the profile in the region of the blade tip is easily variable in a current- or voltage-dependent manner.

In FIG. 2, the rotor blade is part of a rotor having an axis of rotation 20. At the rotor blade, strain gauges may be used in a known manner to detect the flexural stresses which are influenced i.a. by fluctuations in aerodynamic forces but also by rotor blade vibrations. In a structure driven by the rotor, e.g. a helicopter, reference sources for the position of the rotor blades relative to the fuselage longitudinal axis are available, e.g. at the rotor head or at the drive. A further reference source is, for example, the position of the swash plate which controls the blade rotations.

Thus, with the aid of the rotor blade tip constructed according to the invention, it is possible by varying the angle of incidence (controllable blade twist) to generate additional aerodynamic forces which vary the aeroelastic equations of motion. The associated control of the dynamic blade motions of the rotor (flapping, lagging and torsional motion) therefore enables a purposeful alteration of the effective angle of incidence, which is composed of the geometric angle of incidence (angle of incidence from: collective blade adjustment, cyclic blade adjustment and controllable blade twist) and an angle of incidence induced from the blade motions. This control of the rotor dynamics allows the following influences to be brought to bear:

1. monitoring or control of aeroelastic instabilities (by regulation),
2. directed control of the aerodynamic forces in order directly to compensate disturbances induced by the flow field (by regulation)
3. control of the dynamic blade motions of the rotor, with the aim of avoiding localized flow effects such as, for example, stall during the return motion of the blade (by regulation).

The important point is that controlled variables may, in accordance with prevailing requirements, be converted quickly into the necessary blade twists.

In FIG. 2, the corresponding closed-loop control is illustrated purely diagrammatically. A controller 30 gets signals from the rotor blade 2 having an axis of rotation 20 as indicated by arrow 31, namely of disturbances and controlled variables such as fluctuations in aerodynamic forces, blade motions and so on.

The controller 30 is moreover influenced by reference sources 32, e.g. the rotor head, the drive and so on, indicated by the arrow 33 which symbolizes the reference quantities.

The controller 30 in turn by means of the manipulated variables—indicated by the arrow 34—controls the actuator force. By means of other manipulated variables—symbolized by the arrow 35—the controller 30 however also controls the reference sources 32.

In preferred arrangements according to the present invention, the rotor has at least two blades and is used in a rotorcraft, i.e. any heavier-than-air craft in which the lift is obtained from one or more rotors. In this case sensors for the forces acting upon said rotor blades are provided and a closed-loop control circuit is provided, said circuit controlling the variation of the aerodynamic flow conditions as a result of twisting of said profile as a function of said forces acting upon the rotor blades and of a position of said rotor blades relative to the fuselage of the rotorcraft.

It will be understood that the above description of the present invention is susceptible to various modifications, changes and adaptations.

What is claimed is:

1. A rotor blade made of fibre-reinforced synthetic resin and having a longitudinal axis and comprising a spar and a tip, wherein said blade has a torsion skin, said torsion skin in the region of said tip, being arranged anisotropically in the sense of a tension/torsion coupling, and wherein a controllable actuator is disposed in said spar, the profile of said blade, at least in the region of said tip, being twistable by said actuator, and said actuator acting upon said tip in the direction of said longitudinal axis.

2. A rotor blade according to claim 1, wherein to achieve anisotropy of the torsion skin there is provided a unidirectional winding having a winding angle relative to said rotor blade longitudinal axis, said angle being less than 45° in dependence upon the force-to-displacement ratio of said actuator.

3. A rotor blade according to claim 1, wherein in the region of said blade tip, said anisotropic torsion skin is disposed resting loosely on said rotor blade spar.

4. A rotor blade according to claim 3, wherein a transversely non-rigid intermediate layer is disposed between said torsion skin and said rotor blade spar.

5. A rotor blade according to claim 4, wherein said actuator is constructed and disposed in such a way that a controlled normal force may be applied in the direction of said longitudinal axis onto an end face of said rotor blade tip.

6. A rotor blade according to claim 5, wherein said actuator is supported in said rotor blade so as to be variable in length and is connected by tensile force transmitting means to the end of the torsion skin at said blade tip.

7. A rotor blade according to claim 6, wherein said actuator, by virtue of an increase in its length, is capable of generating a twisting of said rotor blade in a first direction (+α) and, by virtue of a shortening of its length, is capable of generating a twisting of the said rotor blade in the opposite direction (−α).

8. A rotor blade according to claim 7, wherein the forces required for twisting the said blade in said first direction are generated by actuator forces and the forces required for twisting said blade in said opposite direction are generated by a centrifugal force.

9. A rotor blade according to claim 6, wherein, as tensile force transmitting means, a rope of high-strength fibres with low longitudinal strains is provided, said rope being connected to a retaining plate, said plate being supported on said rotor blade tip and being supported on an end of said anisotropic torsion skin and connected firmly to said torsion skin.

10. A rotor blade according to claim 9, wherein said retaining plate takes the form of a weight generating centrifugal force.

11. A rotor blade according to claim 1, wherein said actuator is a piezoactuator.

12. A rotor blade according to claim 1, wherein said actuator is a magnetostrictive actuator.

13. A rotor blade according to claim 1, wherein control means are provided for said actuator, said control means effecting twisting of said torsion skin in dependence upon the rotor blade position in a system having a rotor with at least one rotor blade.

14. A rotor blade according to claim 13, wherein said rotor has at least two rotor blades.

15. A rotor blade according to claim 14, wherein said system is a rotorcraft system.

16. A rotor blade according to claim 15, wherein sensors for the forces acting upon said rotor blades are provided and a closed-loop control circuit is provided, said circuit controlling the variation of the aerodynamic flow conditions as a result of twisting of said profile as a function of said forces acting upon the rotor blades and of a position of said rotor blades relative to the fuselage of a rotorcraft.

* * * * *